June 7, 1938.    M. M. CLAYTON    2,119,777
OUTLET DUCT
Filed May 4, 1936
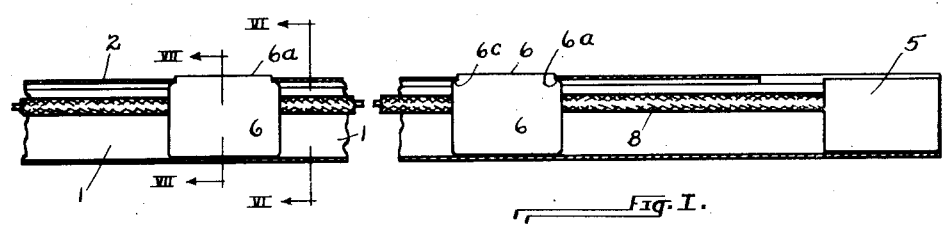
Fig. I.
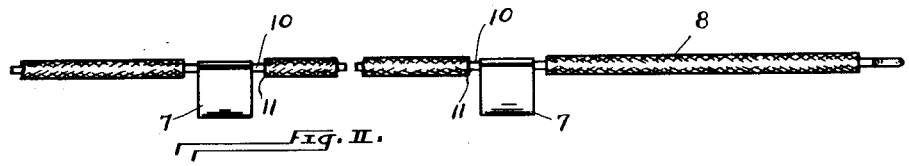
Fig. II.
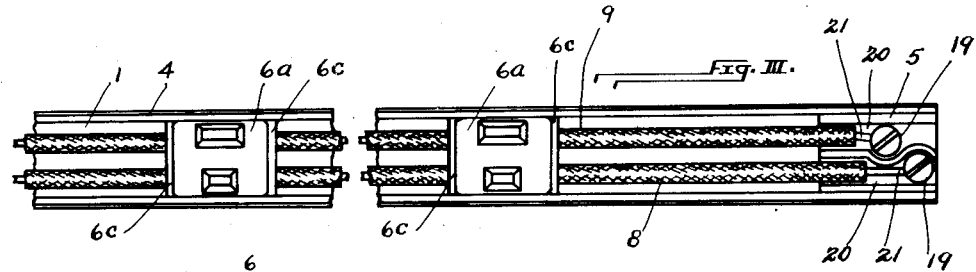
Fig. III.
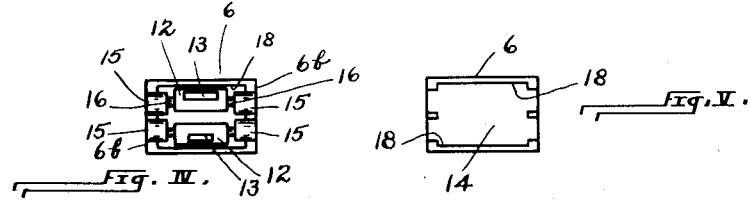
Fig. IV.    Fig. V.
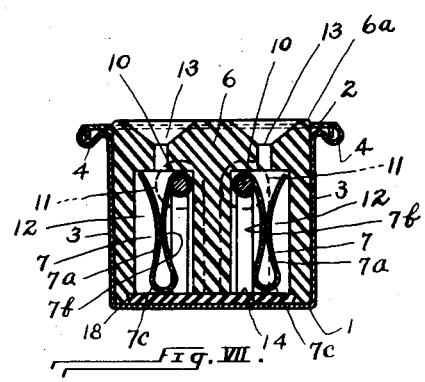
Fig. VII.
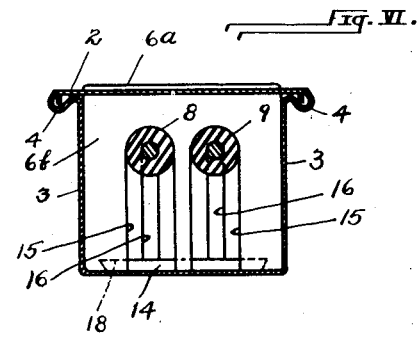
Fig. VI.
INVENTOR
Martin M. Clayton
BY Christy and Wharton
ATTORNEYS Patented June 7, 1938

2,119,777

UNITED STATES PATENT OFFICE 2,119,777

OUTLET DUCT

Martin M. Clayton, Baden, Pa., assignor to National Electric Products Corporation, a corporation of Delaware Application May 4, 1936, Serial No. 77,705

5 Claims. (Cl. 247—28)

This invention relates to a multiple outlet duct, or plug-in strip, produced in factory-assembled unit lengths; and relates more particularly to receptacle elements installed in the conduit or housing element of the duct assembly to position conductors and contacts therein, and to the arrangement of the conductive wires and contact elements with respect to the receptacle elements of the assembly.

In my conductive assembly, by which I intend to designate the receptacle elements and terminal blocks of an assembled unit length of duct, as well as the conducting and associated contact elements of the unit, it is a matter of importance that the contact elements are of such form and so arranged that they make electrical contact with more than one face of each of the prongs of a contact plug. Also, it is of importance that the contact elements of the duct are adapted mechanically to engage the prongs of a plug in a manner to have a wiping contact with them.

With these problems in mind I so form and arrange the elements of the conductive assembly of a multiple outlet duct that the receptacles receive contact clips in such position that they present an opening between cooperative resilient contact leaves at prong openings in the receptacle element of the conductive assembly, and relatively so arrange the conductive wires and contact elements of the assembly that the position of the wires in the receptacle elements is consistent with appropriate presentation of contact clips in the manner desired.

As incidents to the object thus noted, and while attaining it, I provide receptacle elements which are simple and compact; and I also so mount and support the conducting wires in the conduit or housing of the duct that they lie in an approximately straight-line position, thus definitely relating the length of the wires to the length of the housing, and thereby facilitating the operation of preparing the conductive assembly for a length of duct and the operation of installing it in the duct length.

In the accompanying drawing Fig. I is a longitudinal, vertical, sectional view through a fragmentary portion of a multiple outlet duct unit, illustrating particularly the position of the conducting wires in the conduit or housing in accordance with the arrangement of my conductive assembly.

Fig. II is a side elevation of one of the conductive elements proper, namely a conducting wire and contact clips, illustrating the spaced mounting of the contact clips on the wire.

Fig. III is a plan view of the multiple outlet duct corresponding in arrangement of elements with the showing of Fig. I, but omitting the cover element of the duct.

Fig. IV is a bottom plan view of one of the receptacle elements with the insulating cover plate of the receptacle removed.

Fig. V is a bottom plan view of the receptacle element, but showing the insulating cover plate in position thereon.

Fig. VI is a cross-sectional view in enlarged scale, taken in the plane of the section line VI—VI of Fig. I, showing a receptacle element of the duct in end elevation.

Fig. VII is a cross-sectional view, on the scale of Fig. VI, through the duct in the plane of the section line VII—VII of Fig. I, intersecting a receptacle element of the duct.

In the drawing reference numeral 1 designates an elongate metallic conduit or housing, which has an integral base and side walls, and which is upwardly open. An elongate cover 2 of suitable resilient material, such as light-gauge metal, is arranged to rest upon the side walls 3 of the housing, and to have a snap engagement with flanges 4 which extend longitudinally of the housing and are projected laterally at the upper edges of the side walls 3. Cover 2 terminates short of the ends of the housing 1 to expose terminal blocks 5 of insulating material, and is windowed at spaced intervals throughout its length to embrace and expose constricted upper regions 6a of receptacle elements 6.

The receptacle elements 6, which are of insulating material, and desirably of molded insulation of some sort, serve to receive contact clips 7 mounted in spaced relation on the conducting wires 8 and 9. As shown particularly in Figs. II and VII of the drawing, each contact clip 7 is attached to a region 10 of one of the wires, from which region the insulation 11 of the conductor has been stripped to make electrical connection with the clip. Each contact clip is an integral piece of light-gauge metal deflected to provide leaves 7a and 7b, which are spaced near the bight 7c of the clip, and which approach each other closely in a region intermediate the height of the clip. At its upper end one of the legs 7b of the contact clip is curled at its edge to receive the stripped region 10 of a wire. The assembly of wire and contact clips is therefore one in which the contact clips are mounted on and depend from the wire. Desirably, permanent physical interconnection is made between contact clips and the wires on which they are mounted, as by soldering, welding, riveting, or otherwise permanently interconnecting the elements.

The receptacle elements 6 are so arranged that the contact clips and wires are mounted therein with the wires spaced adjacent the upper extremities of the contact clips, and with the opening between the free edges of the clip leaves 7a and 7b presented to the prong-receiving openings 13 of the receptacle. As mounted, the contact clips lie in laterally compressed position in recesses 12 of the receptacle, which recesses are in communication upwardly with the prong-receiving openings 13 and are closed beneath by means of a cover plate 14.

Through the side walls 6b of the receptacle are relatively wide downwardly open slots 15 to receive a short length of the insulated conductor, these slots communicating by means of relatively narrow slots 16 with the recesses 12 in which the contact clips are housed. The cover plate 14 is desirably of light-gauge resilient fibre-plate shaped wholly to close the lower open end of the receptacle. It has a snap engagement in a socket 18 formed in the base of the receptacle block.

In making assembly, the contact clips 7 on each of the conductors are inserted into the aligned recesses 12 of the receptacles, with the open end of each of the clips, and the conductor to which the clip is attached, lying adjacent that end of the receptacle to which prong openings 13 lead. In so doing the spacing of the receptacles is determined by the linear spacing of the contact clips on the wire, and the conducting wires terminate accurately at the binding posts 19 of the insulating blocks 5 mounted at each end of the housing. As mounted in a position spaced a substantial distance from the base of each receptacle, the conducting wires are vertically in line with the grooves 20 of the terminal blocks prepared for their reception. The conductive assembly may thus be made up as a whole prior to insertion in the housing, and as made up extends an appropriate length in the housing to bring the end faces of the terminal blocks in alignment with the terminal edge of the housing.

Referring particularly to Fig. VII of the drawing, it will be seen that the engagement of the contact clips with the conducting wires is such that the wires neither abbreviate the effective height of the contact clips, nor do they require the use of receptacles and housing of increased depth to receive them. In the assembly, on the contrary, the wires are supported at a convenient height by their attachment to the contact clips and are held in a position in which they do not tend to obstruct full double contact between the clips and contact prongs. The use of the resilient insulating cover plates 14, which engage definitely with the body of the receptacle, serves further to integrate the conductive assembly, since the application of these cover plates locks the contact clips and conducting wires in position when the conductive assembly is made.

In installation of the conductive assembly in the housing, the cover, by bearing at its edges surrounding the receptacle windows upon receptacle shoulders 6c, serves to lock the conductive assembly in the housing. It is to be understood that when duct sections are installed in end abutment with each other to provide an extended raceway, the uncovered intervals 21 adjacent the ends of abutting lengths of duct are bridged by relatively short imperforate cover elements, which cover elements enclose the abutting terminal blocks 5 of the adjacent duct lengths.

The mounting of contact clips on the conducting wire to depend therefrom, and in assembly to support the wire, solves the problem of obtaining good electrical contact with the conductors of the duct while employing conducting wires of simple unspecialized form. This advantage is obtained while also utilizing an elongate housing of simple contour and moderate depth.

I claim as my invention:

1. A mounted electrically conductive assembly for installation in an elongate housing to compose a multiple outlet duct, comprising at least one insulating body formed to contain spring contact clips and to admit attachment plug prongs thereto, contact clips in the form of U-shape members of light gauge metal each arranged in said insulating body to present its open end for the reception of a contact plug prong between its leaves, and conventional conductor wires each bonded to the outer surface of a contact clip leaf adjacent the free end of the leaf to make physical and electrical assembly with the contact clips without obstructing the passage between the leaves of the clips; whereby each contact clip presents to an attachment plug prong the interval between both leaves of the clip and has its full depth available to receive such prong.

2. A conductive assembly in accordance with the combination of claim 1 in which the attachment of each of the conductor wires to a U-shape contact clip is to the outer surface of that leaf of the clip which in assembly lies closer the longitudinal center of the insulating body; whereby in spacing of the contact clips in accommodation to the prong spread of standard attachment plugs the width of the insulating body necessary so to space the contact clips is minimized.

3. A mounted electrically conductive assembly for installation in an elongate housing to compose a multiple outlet duct, comprising at least one insulating body formed to contain spring contact clips and to admit attachment plug prongs thereto, contact clips in the form of U-shape bow springs each arranged in said insulating body to present its open end for the reception of a contact plug prong between its leaves, and conventional conductor wires each bonded to the outer surface of a contact clip leaf adjacent the end of the leaf to make physical and electrical assembly with the contact clips without obstructing the passage between the leaves of the clips, the said contact clip leaves to which the conductor wires are bonded being hooked over the wires in the region of bonding to relieve the bond of the strain resulting from prong insertion between the contact clip leaves; the said contact clip in such assembly with the conductor wire having its entire depth available to receive an attachment plug prong and thereby to minimize the necessary depth of the insulating body containing the contact clips.

4. A conductive assembly in accordance with the combination of claim 3 in which the attachment of each of the conductor wires to a U-shape spring contact clip is to the outer surface of that leaf of the clip which in assembly lies closer the longitudinal center of the insulating body; whereby in spacing of the contact clips in accommodation to the prong spread of standard attachment plugs the width of the insulating body necessary so to space the contact clips is minimized.

5. For installation in a multiple outlet duct length as a preformed electrically conductive element adapted to make electrical connection with pronged attachment plugs an insulated wire of conventional form having the insulation thereof stripped at spaced intervals therealong, and U-shape bow spring contact clips each suspended from the said wire and having the free end of one leaf of each hooked over and bonded to a conductor wire in a region thereof from which the insulation has been stripped to provide a prong-way between the leaves of the spring contact clip and to one side of the conductor wire to which the contact clip is bonded; whereby each contact clip is adapted unobstructedly to receive an attachment plug prong between its leaves and in contact with both, and whereby insertion of such prong between the leaves of the contact clip does not tend to disrupt the bond between the contact clip and the conductor wire.

MARTIN M. CLAYTON.